March 10, 1970 — W. M. HEINKE — 3,499,417
TRANSLUCENT INSTRUMENT DIAL MEANS
Filed June 7, 1967
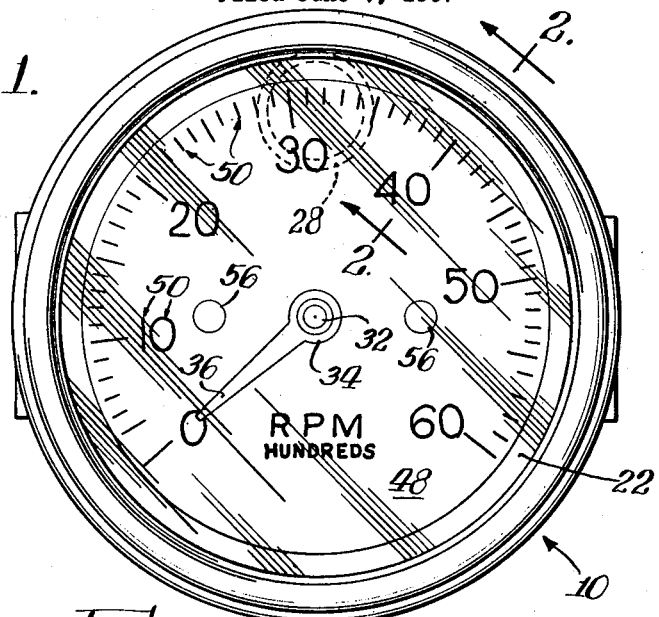
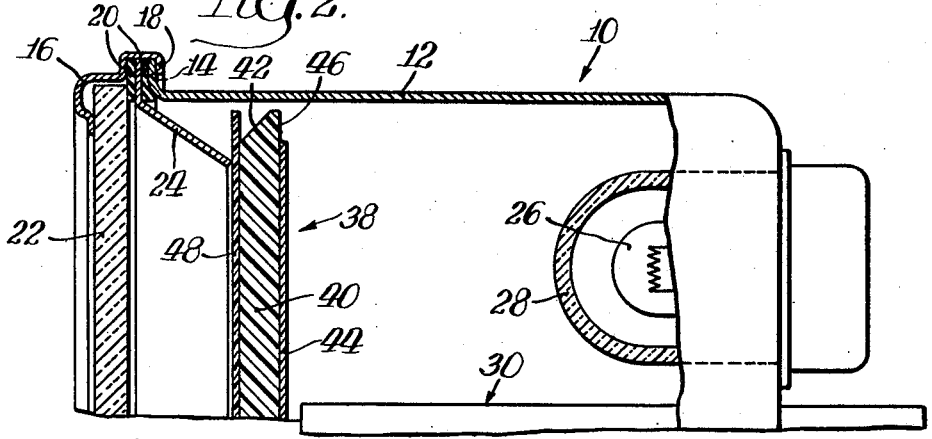
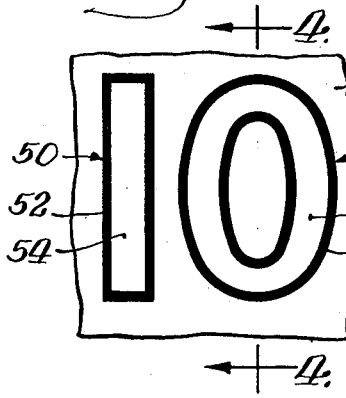 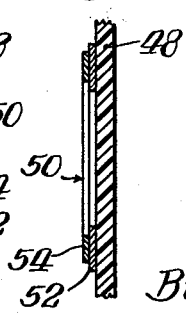
Inventor:—
Walter M. Heinke,

United States Patent Office 3,499,417
Patented Mar. 10, 1970

3,499,417
TRANSLUCENT INSTRUMENT DIAL MEANS
Walter M. Heinke, Chicago, Ill., assignor to Stewart-Warner Corporation, Chicago, Ill., a corporation of Virginia
Filed June 7, 1967, Ser. No. 644,300
Int. Cl. G09f 9/30
U.S. Cl. 116—129            5 Claims

ABSTRACT OF THE DISCLOSURE

An illuminated dial plate means for instruments where the dial plate includes a layer of optical material, opaque light-colored indicia on the layer and opaque dark-colored material bordering the indicia whereby the indicia is distinguishable under all usual illuminating conditions of operation of the instrument dial plate.

BACKGROUND OF THE INVENTION

Field of the invention

The present invention pertains generally to dial plate means which may be incorporated in an instrument assembly such as a tachometer, pressure gauge, temperature gauge, clock and the like, and which is adapted to be illuminated by an artificial light source.

Description of the prior art

Conventional instrument assemblies of the type indicated comprise a casing having an open forward end and a closed rearward end, an indicator pointer movable in a plane extending transversely of the casing adjacent the forward end thereof, a light source interiorly of the casing, and dial plate means disposed transversely of the casing intermediate of the indicator pointer and the light source. Various embodiments of dial plate means, which are especially adapted for use in instrument assemblies, are disclosed and claimed in the copending application of Edgar R. Baez, Walter M. Heinke, Marshall Miles and Josef von Nemeth, Ser. No. 641,105, filed May 9, 1967. One dial plate disclosed and claimed in the aforesaid copending application comprises means supporting a layer of optical material and opaque light colored indicia on the layer whereby the dial plate normally has a dark appearance with light indicia when the light source is not energized and has a light appearance with dark silhouette indicia when the light source is energized. This type of dial plate described above, normally has a dark appearance tween back illumination of the dial plate by the light source and front illumination of the dial plate by ambient light—that is, when the intensity of the ambient light approximates the intensity of light transmitted through the dial plate while the light source is energized—the entire dial plate appears gray and the indicia become indistinguishable.

SUMMARY OF THE INVENTION

The present invention contemplates the provision of an instrument dial plate comprising means supporting a layer of optical material, opaque light colored indicia on the layer, and opaque dark colored borders around the perimeters of the indicia. This dial plate, like the dial plate described above, normally has a dark appearance with light indicia when the light source is not energized and has a light appearance with dark silhouette indicia when the light source is energized. In addition, the dark colorerd borders serve to maintain the indicia distinguishable when the intensity of the ambient light approximates the intensity of light transmitted through the dial plate while the light source is energized. Thus, the indicia on the dial plate of the present invention are distinguishable under all usual conditions of operation of the instrument dial plate.

BRIEF DESCRIPTION OF THE DRAWING

FIGURE 1 is a front elevational view of an instrument assembly incorporating the dial plate means of the present invention;

FIGURE 2 is a partial longitudinal sectional view, on an enlarged scale, of the instrument assembly of FIGURE 1, taken substantially along the line 2—2 in FIGURE 1, looking in the direction indicated by the arrows;

FIGURE 3 is a further enlarged fragmentary front view of a portion of the dial plate means of FIGURE 1; and FIGURE 4 is a fragmentary sectional view, taken substantially along the line 4—4 in FIGURE 3, looking in the direction indicated by the arrows.

DESCRIPTION OF THE PREFERRED EMBODIMENT

Referring now to FIGURES 1 and 2, the improved dial plate means of the present invention to be described hereinafter is shown, for illustrative purposes only, incorporated in a tachometer instrument assembly 10. It will be readily appreciated by those skilled in the art that such improved dial plate means may be embodied in various other forms of instrument assemblies including pressure gauges, temperature gauges, clocks and the like.

The instrument assembly 10 comprises a cylindrical casing 12 having a closed rearward end and an open forward end with an outturned radial flange 14. Suitably secured at the forward end of the casing 12 is an annular collar 16 having an inturned radial flange 18 that engages the back side of the casing flange 14. The collar 16, together with the casing flange 14 and intermediate gaskets 20, serves to mount in position a glass cover 22 and a shroud-like retainer 24. Mounted interiorly of the casing 12 at the rearward end thereof is a light source 26, for example an incandescent 12-volt bulb, enclosed within a light diffuser 28. Extending longitudinally into the casing 12 is a tachometer unit or mechanism of which a fragmentary portion is indicated at 30. The tachometer unit 30 includes a forwardly projecting indicator shaft 32 on the end of which is secured indicator means 34 comprised of an opaque pointer portion 36. The indicator means 34 is movable in a plane extending transversely of the casing 12 adjacent the retainer 24 at the forward end of the casing.

Dial plate means, indicated generally by the reference numeral 38 is disposed transversely of the casing 12 immediately rearwardly of the plane of the indicator means 34. The dial plate means comprises a circular transparent disc 40 which serves both as a support and as a light conductor. The disc 40 is composed of a crystal clear material, preferably plastic, such as acrylic (e.g., Lucite or Plexiglas) or a polycarbonate (e.g., Lexan), selected to meet temperature and environmental requirements. The edge 42 of the disc 40 is bevelled in a forward direction at an angle or approximately 45 degrees.

The dial plate means 38 also comprises a circular layer of translucent material 44 on the rearward side of the disc 40. The material 44 is light in color, is preferably a white silver or light blue paint, and may be applied in any conventional manner. The outer perimeter of the layer of material 44 is spaced radially inwardly of the margin of the back side of the disc 40 whereby to provide an annular clear area 46 to accommodate edge lighting as will be described hereinafter.

The dial plate means 38 further includes a layer of optical material 48 on the front side of the disc 40. More specifically, the layer 48 is a plastic film having a dark color (preferably black) homogeneously dispersed throughout the film in order to provide dark optically absorbent film which is capable of absorbing substantially all of the ambient light falling on the dial as observed by the viewer when the light source 26 is unenergized, but which transmits a substantial amount of light from the light source 26 when the latter is energized. The film 48 is preferably a black tinted plastic overlay material such as Mylar film, but may be a polycarbonate film (e.g., Lexan). A Lexan film may be used in unmodified or modified form. When unmodified, the Lexan material is transparent but serves to absorb a portion of the light illuminating the dial. Alternatively, the Lexan film may be made translucent with a light diffusing surface by either applying a vaporized lacquer finish or providing a mat surface on the front side of the overlay. In place of Mylar film or a Lexan overlay, other light absorbent materials may be used, such as a photographic negative which has been exposed to light and subsequently developed.

The layer of optical material 48, shown in FIGURE 1, is overprinted on the front side with desired calibrations, numerals, and other markings and indicia, indentified by the reference numeral 50. Each indicium 50, as shown in FIGURES 3 and 4, is comprised of an opaque dark colored component or substratum 52 applied directly on the layer 48, and an opaque light colored component 54 superimposed on the component 52. Both components 52 and 54 may be formed of a material such as ink or paint. The component 52, which is preferably black, extends beyond the perimeter of the component 54 whereby to define a narrow opaque dark colored border around the indicium 54 which is preferably white.

The dial plate means 38 is adapted to be mounted in position by means of screws 56 which extend through the dial and are threaded into the tachometer mechanism 30. The dial 38 is also suitably apertured in the center to accommodate the indicator shaft 32.

When the light source 26 is not energized, the layer 48 normally has a dark appearance with light indicia defined by the light colored components 54. When the light source 26 is energized, a portion of the light emitted passes through and is evenly diffused by the rear layer of translucent material 44. At the same time, light rays pass through the face of the annular clear area 46 of the disc 40 and are reflected at the bevelled edge 42 generally radially into the disc where they richochet between the layers 44 and 48. Finally, light within the disc 40 passes through and is evenly diffused by the forward optical layer 48. The thus illuminated layer 48 has a light appearance with dark silhouette indicia defined compositely by the dark and light colored indicia components 52 and 54. In addition, the opaque dark colored borders provided by the substrata 52 around the perimeters of the light colored indicia components 54 serve to maintain the indicia 50 distinguishable whenever the intensity of ambient light approximates the intensity of light transmitted through the layer 48 from the light source 26 while the latter is energized. More particularly, as the intensity of ambient light changes through the range of the intensity of light transmitted by the light source 26, there is a brief period when a silhouette of the dark indicia borders from the back illumination and a light image of the light colored indicia components from reflected ambient light are both visible. As a consequence of providing the indicia on the layer 48 with dark borders, in accordance with the principles of the present invention, the indicia are distinguishable under all usual conditions of operation of the dial plate means 38.

While there has been shown and described a preferred embodiment of the present invention, it will be understood by those skilled in the art that various rearrangements and modifications may be made therein without departing from the spirit and scope of the invention.

I claim:
1. In an instrument assembly having a casing with an open forward end and a closed rearward end, a dial plate extending transversely of said casing adjacent the forward end thereof, a light source interiorly of said casing illuminating the back of said dial plate, and said dial plate including means supporting a layer of dark colored translucent material and opaque light colored indicia on said layer whereby said dial plate normally has a dark appearance with light indicia when said light source is not energized and has a light appearance with dark silhouette indicia when said light source is energized, the improvement comprising opaque dark colored, substantially constant width borders around the edges of said indicia on said layer which borders serve to maintain said indicia distinguishable whenever the intensity of ambient light approximates the intensity of light trasmitted through said dial plate from said light source while the latter is energized.

2. The improvement of claim 1 wherein said borders are defined by opaque dark colored substrata interposed between said layer and said indicia and extending beyond the perimeters of the latter.

3. In an instrument assembly having a casing with an open forward end and a closed rearward end, a dial plate extending transversely of said casing adjacent the forward end thereof, a light source interiorly of said casing, said dial plate including means supporting a layer of optical material having the optical characteristics of causing absorption of substantially all ambient light incident thereupon but transmitting a substantial amount of light from said light source, and indicia on said layer, the improvement comprising said indicia having opaque light colored components and opaque dark colored components providing narrow, substantially constant width borders around the edges of said light colored components whereby said dial plate normally has a dark appearance with light indicia defined by said light colored components when said light source is not energized and has a light appearance with dark silhouette indicia defined compositely by said light and dark colored components when said light source is energized and whereby said borders serve to maintain said indicia distinguishable whenever the intensity of ambient light approximates the intensity of light transmitted through said dial plate from said light source while the latter is energized.

4. The improvement of claim 3 wherein said dark colored components are applied directly on said layer and said light colored components are superimposed on said dark colored components.

5. The improvement of claim 4 wherein said dark colored components are black and said light colored components are white.

References Cited

UNITED STATES PATENTS

| | | | |
|---|---|---|---|
| 861,716 | 7/1907 | Ebert. | |
| 1,917,079 | 7/1933 | Adams. | |
| 2,009,210 | 7/1935 | Scantlebury | 240—2.1 |
| 2,100,875 | 11/1937 | Scantlebury | 240—2.1 |
| 2,214,209 | 9/1940 | Triplett | 240—2.1 |
| 2,272,806 | 2/1942 | Klein et al. | 240—2.1 |
| 2,861,537 | 11/1958 | Kadlec | 116—129 |
| 2,886,911 | 5/1959 | Hardesty | 116—129 X |

LOUIS R. PRINCE, Primary Examiner

DANIEL M. YASICH, Assistant Examiner

U.S. Cl. X.R.

40—130; 240—2.1